US012644523B2

(12) United States Patent
Startz et al.

(10) Patent No.: US 12,644,523 B2
(45) Date of Patent: Jun. 2, 2026

(54) UNBALANCED PRESSURE ACTIVATED VALVE SEAL ASSEMBLY

(71) Applicant: Force Pressure Control, LLC, Seguin, TX (US)

(72) Inventors: Jacob Startz, Seguin, TX (US); Dustin Nesloney, Orange Grove, TX (US); Jason Beck, Cypress, TX (US)

(73) Assignee: Force Pressure Control, LLC, Seguin, TX (US)

( * ) Notice: Subject to any disclaimer, the term of this patent is extended or adjusted under 35 U.S.C. 154(b) by 0 days.

(21) Appl. No.: 18/816,074

(22) Filed: Aug. 27, 2024

(65) Prior Publication Data

US 2025/0137534 A1 May 1, 2025

Related U.S. Application Data

(60) Provisional application No. 63/594,584, filed on Oct. 31, 2023.

(51) Int. Cl.
*F16K 3/02* (2006.01)

(52) U.S. Cl.
CPC .......... *F16K 3/0236* (2013.01); *F16K 3/0227* (2013.01)

(58) Field of Classification Search
CPC .............................. F16K 3/0227; F16K 3/0236
See application file for complete search history.

(56) References Cited

U.S. PATENT DOCUMENTS

| | | | |
|---|---|---|---|
| 6,279,875 | B1 | 8/2001 | Chatufale |
| 6,966,537 | B2 | 11/2005 | Sundararajan |
| 7,032,880 | B2 | 4/2006 | Scaramucci |
| 7,559,531 | B2 | 7/2009 | Thomas et al. |
| 7,758,016 | B2 | 7/2010 | Scott et al. |
| 8,327,866 | B2 | 12/2012 | Parks, Jr. |
| 8,672,295 | B2 | 3/2014 | Dhawan et al. |
| 8,720,855 | B2 | 5/2014 | Beasley |
| 8,973,897 | B2 | 3/2015 | Cordova et al. |
| 9,285,039 | B2 | 3/2016 | Collison et al. |
| 9,453,578 | B2 | 9/2016 | Sundararajan |
| 9,551,425 | B2 | 1/2017 | Buck |
| 9,915,359 | B2 | 3/2018 | Ricard et al. |
| 10,197,168 | B1 | 2/2019 | Whitlow |
| 10,400,901 | B2 | 9/2019 | Salem et al. |
| 10,914,387 | B2 | 2/2021 | Helfer et al. |
| 10,969,023 | B2 | 4/2021 | Mcguire et al. |
| 10,982,779 | B2 | 4/2021 | Morello |
| 11,009,136 | B2 | 5/2021 | Berkovitz et al. |
| 11,041,569 | B2 | 6/2021 | Krause et al. |

(Continued)

*Primary Examiner* — Kelsey E Cary
(74) *Attorney, Agent, or Firm* — RegitzMauck PLLC; Dustin Mauck; Michael Regitz

(57) ABSTRACT

The present invention comprises a valve assembly with an unbalanced seal between sealing components of the valve assembly. For a gate valve assembly, an upstream seat may have a different outer diameter than a downstream seat, thereby creating an unbalanced seal with the gate. By increasing the sealing surface of the downstream gate/seat interface and by decreasing the sealing surface of the upstream gate/seat interface, the gate/seat interface may seal at lower pressures. A bidirectional seal is also disclosed that may prevent grease or sand from entering a cavity of the seat/pocket insert interface and assists with controlling the pressures and torque on the valve assembly.

17 Claims, 7 Drawing Sheets

(56) References Cited

U.S. PATENT DOCUMENTS

| | | | |
|---|---|---|---|
| 11,079,024 B1 | 8/2021 | Cotton et al. | |
| 11,174,958 B2 | 11/2021 | Moseley et al. | |
| 11,313,479 B2 | 4/2022 | Nighot et al. | |
| 11,435,001 B2 | 9/2022 | Kalimuthu | |
| 11,644,105 B2 | 5/2023 | Sundararajan | |
| 11,649,902 B2 | 5/2023 | Roppolo et al. | |
| 11,725,738 B2 | 8/2023 | Mullins et al. | |
| 11,754,190 B2 | 9/2023 | Valera et al. | |
| 2012/0085957 A1* | 4/2012 | Dhawan | F16K 3/0209 |
| | | | 251/326 |
| 2016/0032676 A1* | 2/2016 | Malone | E21B 29/08 |
| | | | 166/55 |
| 2016/0312904 A1* | 10/2016 | Hoang | E21B 33/063 |
| 2017/0335977 A1* | 11/2017 | Salem | F16K 5/0642 |
| 2018/0238456 A1* | 8/2018 | Farquharson | F16K 3/16 |
| 2019/0170262 A1* | 6/2019 | Morello | F16K 5/201 |
| 2020/0200272 A1* | 6/2020 | Travis | F16K 3/0263 |
| 2020/0240537 A1* | 7/2020 | Moseley | F16K 3/30 |
| 2020/0347942 A1* | 11/2020 | Krause | F16K 1/427 |
| 2022/0120350 A1* | 4/2022 | Valera | F16K 5/0673 |

* cited by examiner

500

508

502

504

506

506

504

UNBALANCED PRESSURE ACTIVATED VALVE SEAL ASSEMBLY

PRIORITY CLAIM

This non-provisional patent application claims priority to U.S. Provisional Patent Application No. 63/594,584 entitled "Unbalanced Pressure Activated Valve Seal Assembly" that was filed on Oct. 31, 2023, and hereby incorporates the entire disclosure herein.

TECHNICAL FIELD

The present invention relates generally to a valve assembly, and more specifically, an unbalanced pressure activated seal for a valve assembly that enables an improved seal between the seat assembly and the gate of the valve.

BACKGROUND OF THE INVENTION

Valves are used in numerous industries to transport and control the flow of water or aqueous solutions, including the oil and gas industry. These valves are designed to start, stop, and even control the flow of liquids through the system. In the oil and gas industry, these liquids may include water, oil mixtures, frac fluids, or other liquid solutions that need to be transported to a well and into the ground or extracted from the ground. Grease or sand within the frac fluid may migrate from the valve passageway to the valve cavity or cavities to cause problems with the valve. In the past, grease or other solutions have been injected to prevent damage to the cavity and or components, but the use of grease or other solutions may be limited if the valve cavities are sufficiently sealed off. If the seals for the valve were improved, then there would be improved function of the valves and less grease may be required to fight against these issues.

BRIEF SUMMARY OF THE INVENTION

The present invention comprises a valve assembly with an unbalanced seal between a gate and seats of the valve assembly for a gate valve. An upstream seat may have a different outer diameter than a downstream seat, thereby creating an unbalanced seal with the gate. In some embodiments, the downstream seat may have a larger outer diameter than the upstream seat. By increasing the metal-to-metal sealing surface of the downstream gate/seat interface and by decreasing the sealing surface of the upstream gate/seat interface, the gate/seat interface may improve the seal at lower pressures. This may limit the need to repeatedly inject grease into the gate valve assembly. In some embodiments, the unbalanced seal is created through differences in thickness, material, or surface texture of the upstream seat in relation to the downstream seat. These differences may also improve the gate/seat seal at lower pressures. While the disclosure herein focuses on valves used in the oil and gas industry, the present invention covers other valves that may be used in other industries to control the movement of fluids at high pressures.

A bidirectional seal is also disclosed that prevents grease or sand from entering one or more cavities of the seat/pocket insert interface and assists with controlling the pressures and torque on the valve assembly. The bidirectional seal may partially absorb the pressures exerted on the gate valve assembly.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

In general, valves or valve assemblies are used to control the movement of liquids, fluids, solutions, water, or other fluids at high pressures. Valves or valve assemblies may be used in various industries in numerous implementations, including but not limited to, the oil and gas industry. Within the oil and gas industry, there are numerous types of valves or valve assemblies that may use the present invention. The present invention is not limited to any specific valve or valve assembly and may be used in various industries and implementations. The figures and descriptions herein disclose a gate valve assembly as one embodiment, but the present invention is not limited to this embodiment. Gate valves or gate valve assemblies are commonly used at oil wells in fracturing (frac) operations. Fluids, such as frac fluids, may consist of water or other solutions combined with proppants or frac sand that pass through the gate valve assemblies. In frac operations, these gate valves may be required to start, adjust, and stop the flow of fluids at pressures of 15,000 psi and higher. In the field, these fluids with the proppants or frac sand may migrate from the valve passageways to cavities within the gate valve assemblies and may degrade the performance of the gate valve assembly. Grease or other materials have been injected to coat the interface surfaces to prevent fluids and proppants from entering, and commonly, the grease or other materials must be applied numerous times to ensure that the proppants or frac sand do not enter the passageways. However, if the seals of the gate valve assembly were more robust, then this process of applying grease may be limited. Thus, improving the seals of the components of the gate valve assemblies would improve frac operations.

Figures 1A, 1B:
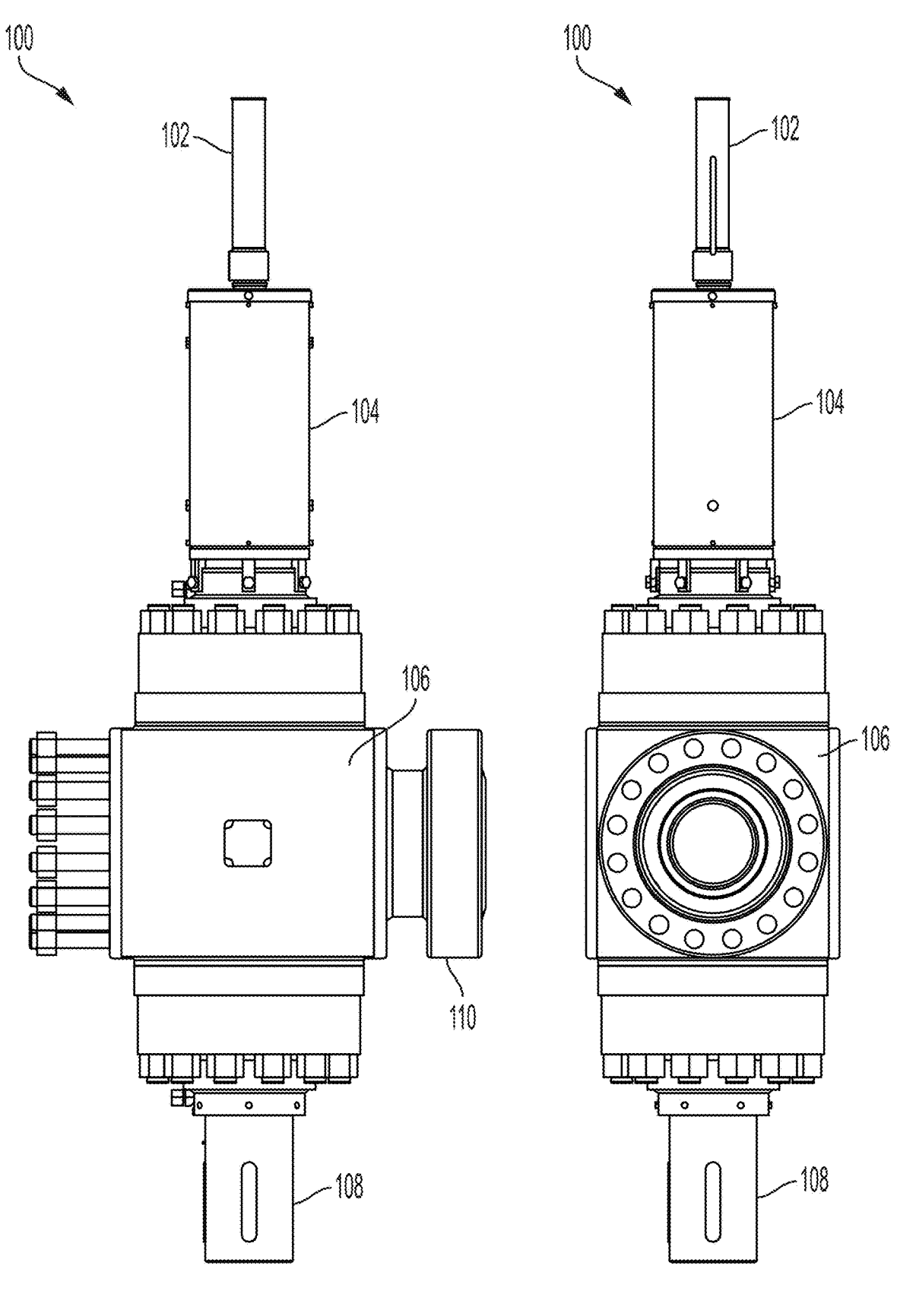
FIGS. 1A and 1B show a front view and a side view of a traditional gate valve assembly.

FIGS. 1A and 1B show a front and side view of a traditional gate valve assembly 100. While the figures shown herein relate to valve assemblies used in oil and gas operations, the present invention is not limited to valve assemblies in this industry and may cover valve assemblies used in other operations and industries. Indicator stem protector 102 is attached to a hydraulic cylinder that fits into a stem protector 104 that that remotely operates the valve assembly 100. Alternatively, a hand-wheel assembly could do the same. An operating stem (within 102) may be connected to a hand wheel (not shown) to manually open and close the gate valve assembly 100. A body 106 houses the functional portion of the valve and allows the fluid to pass through the gate valve assembly 100. A balance stem protector 108 protects a balance stem (not shown). A flange 110 may be used to connect other valves or pipes to the gate valve assembly 100. A gate (not shown) and a seat assembly (not shown) are located inside the body 106.

Figure 2:
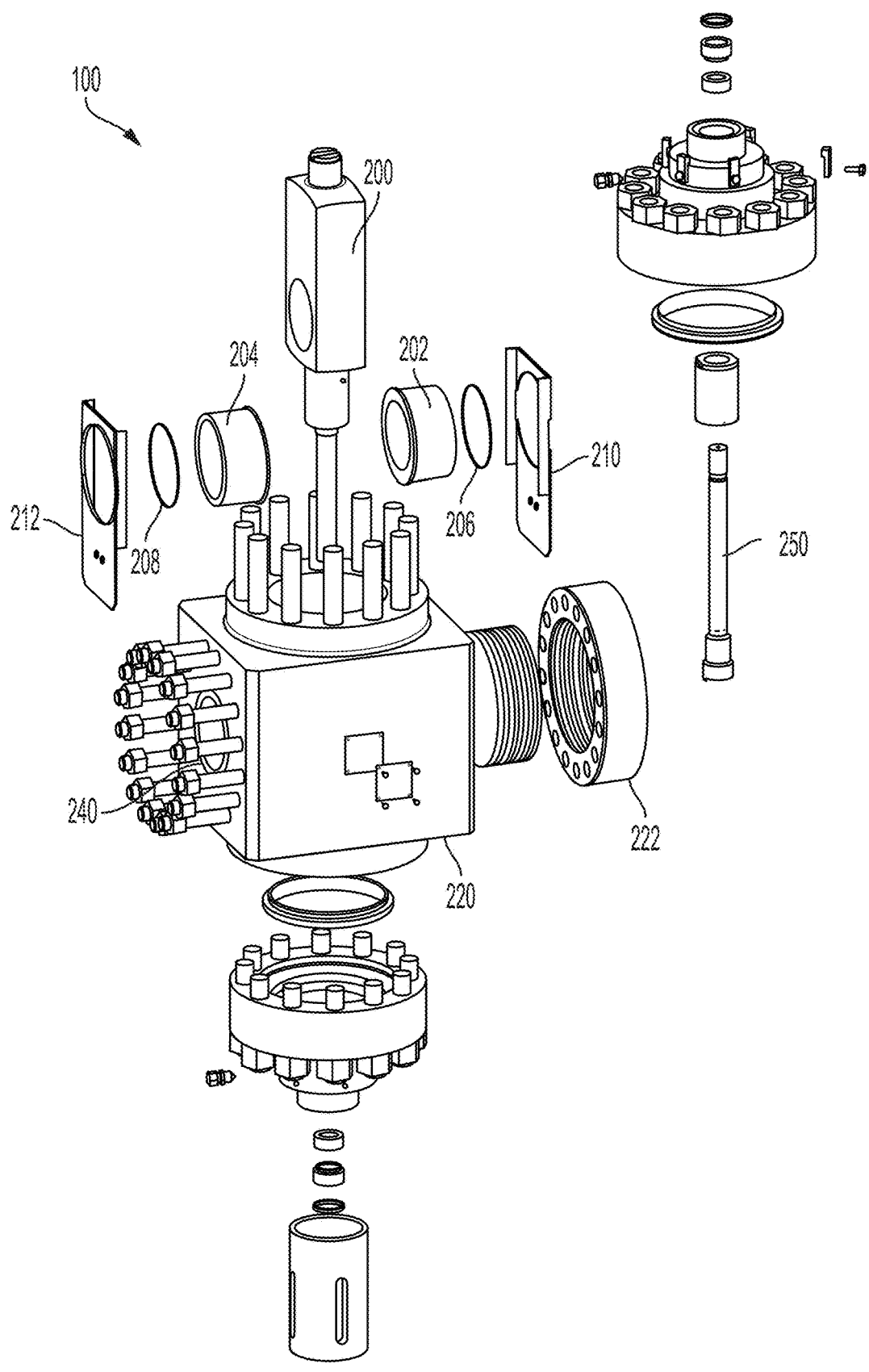
FIG. 2 shows an exploded view of a traditional gate valve assembly.

FIG. 2 shows an exploded view of the gate valve assembly 100 with the internal components. A gate 200 fits inside the gate valve assembly 100. An operating stem 250 enables the gate 200 to slide up and down within a body 220 of the gate valve assembly 100 to open and close the valve. Gate guides 210, 212 also protect the gate 200 during operation. The gate 200 connects to the operating stem 250 to enable remote control of the gate 200. For example, routing fluid remotely to hydraulic cylinder 104 will cause the operating stem 250 to push the gate 200 down or up to open or close the gate valve assembly 100. The same action can be created with a hand wheel assembly at the valve assembly. Two seats 202, 204 are located on each side of the gate 200. The gate 200 in conjunction with the seats 202, 204 open and close the passageway within the body 220 of the gate valve assembly 100. Gate guides 210, 212 are also located on each side of the gate 200 to prevent material from entering or exiting the valve cavity as gate 200 opens and closes the valve. Seat seals 206, 208 may be used to seal the interfaces between the seats 202, 204 and seat pockets in valve body 220. In some embodiments, the fluid or water may enter the body 220 through passageway 240. In FIG. 2, the fluid may enter the gate valve assembly 100 through passageway 240 and exit the other side through a flange 222. Fluid into passageway 240 may be considered upstream, while fluid exiting flange 222 may be considered downstream. In traditional gate valve assemblies 100, the outer diameters of the seats 202, 204 were the same.

Figure 3:
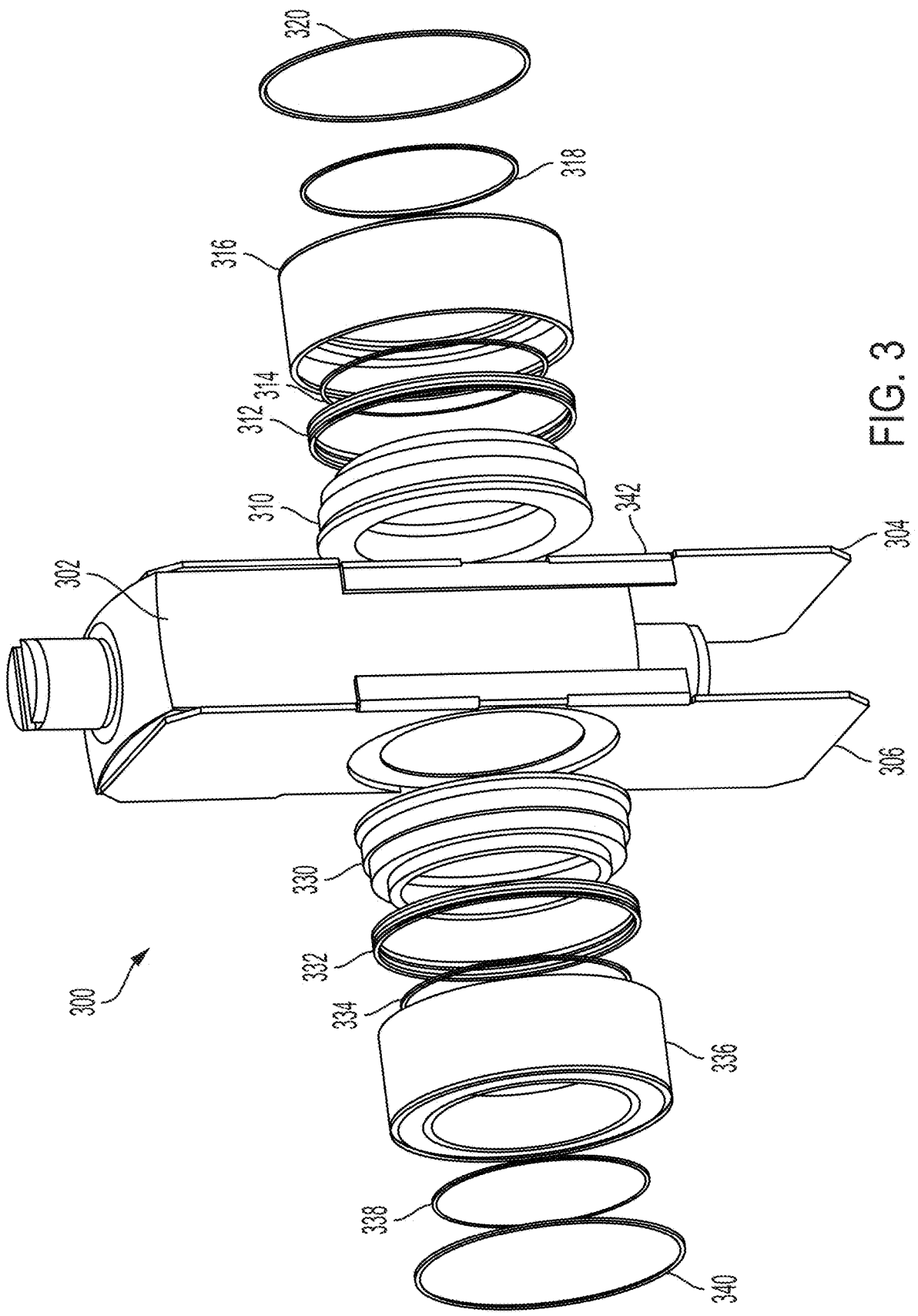
FIG. 3 shows an exploded view of a gate and a seat assembly according to certain embodiments of the present invention.

FIG. 3 shows an exploded view of a gate and a seat assembly 300 according to certain embodiments of the present invention, however, this gate and seat assembly 300 is different than the one shown in FIG. 2. The gate 302 resembles the gate 200 shown in FIG. 2. It may connect to a stem that enables the gate 302 to move up and down, which may be controlled manually or remotely through a hydraulic cylinder. Two gate guides 304, 306 haven been extended to prevent material from entering or exiting the valve cavity when operating gate 302. The guides 304, 306 also protect the gate 302. A seat 310 is designed to seal against a gate 302 and a pocket insert 316 is designed to hold the seat insert 310 in place and seal against the valve body 342. A bidirectional seal 312 may be used to seal the seat insert 310 against the pocket insert 316. As will be discussed further, the bidirectional seal 312 may be used to prevent sand from escaping the passageway of the gate valve assembly 100. As shown in FIG. 3, the seat inserts 310 may have various steps (ridges) or diameters along its length on the seat insert 310. Additional seals 314, 318, 320 may be used to seal these steps (ridges) of the seat insert 310 against the pocket insert 316 and the valve body. The pocket insert 316 may have complementary internal ridges to match up with the seat insert 310. Seal 320 may be considered the outer diameter seal, and inner diameter seal 318 may be the inner diameter seal. These are used to seal the pocket insert 316 and the valve body—seat pocket.

A seat insert 330 is designed to seal against the gate body 302 and a pocket insert 336 is designed to hold the seat insert 330 in place and seal against the valve body 342. A bidirectional seal 332 may be used to seal the seat insert 330 against the pocket insert 336. As shown in FIG. 3, the seat insert 330 may have various steps or diameters along its length for the ridges on the seat insert 330. Additional seals 334, 338, 340 may be used to seal these ridges of the seat insert 330 against the pocket insert 336. The seat insert 330 may have a different outer diameter than seat insert 310. This means that the surface area interfacing the gate 302 is larger for the seat insert with the larger outer diameter. By making one seat insert larger than the other, an unbalanced gate/seat assembly may be obtained.

Figures 4A, 4B, 4C, 4D:
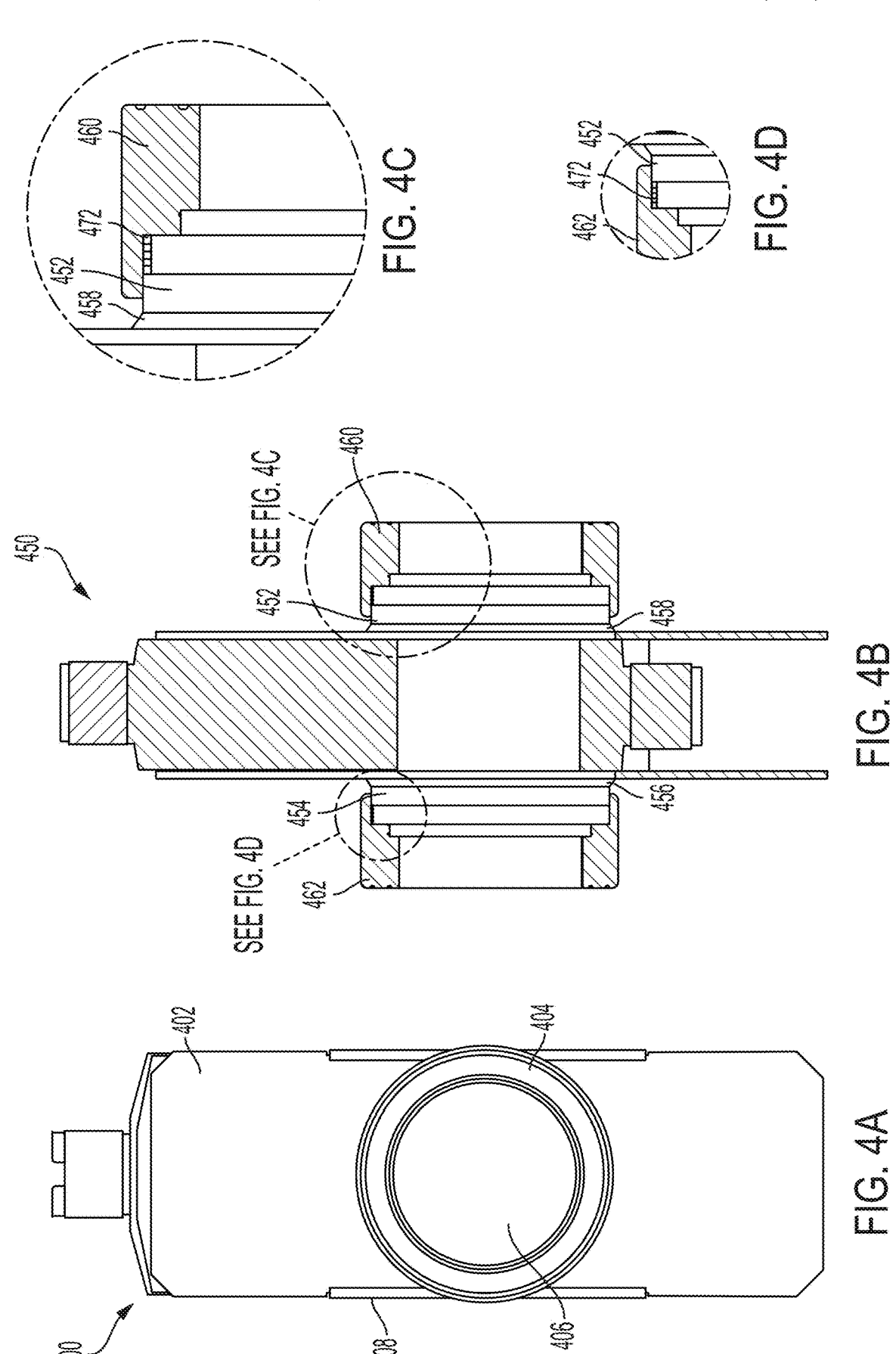
FIG. 4A shows a side view of a gate according to certain embodiments of the present invention.
FIG. 4B shows front view of a gate and a seat assembly according to certain embodiments of the present invention.
FIGS. 4C and 4D show enlarged sections of the gate and seat assembly shown in FIG. 4B according to certain embodiments of the present invention.

FIG. 4A shows a side view of the gate 400. A gate 402 comprises a sealing surface 404 and a guide 408 controls the movement of the gate 400 within the gate assembly of valve 100. Reference numeral 406 shows the passageway within the gate where fluid may pass when the gate valve assembly is open.

FIG. 4B shows a cross-sectional side view of a gate/seat assembly 450. Two seat inserts 452, 454 seal to the gate through sealing surfaces 456, 458. Two pocket inserts 460, 462 house or hold the seat inserts 452, 454. FIGS. 4C and 4D show enlarged views of the interface between the seat inserts 452, 454, gate sealing surfaces 456, 458, and the use of the pocket inserts 460, 462. These enlarged views also show the different diameters of the seat inserts 452, 454 and the pocket inserts 460, 462. A bidirectional seal 472 is also shown in FIG. 4D to seal a cavity that exists in the connection between the seat insert 452 and the pocket insert 460. A tight metal-to-metal seal between the seat inserts 452, 454 and the gate body 456, 458 is strong and may prevent loss of grease or sand entering other cavities of the gate/seat assembly 450 during operation or closing of the valve. Once again, the outer diameter of seat insert 452 may be different than seat insert 454 to create an unbalanced seal (the corresponding pocket inserts 460, 462 and seals may also have different diameters for tight connections and seals). In one embodiment, the diameter of the downstream seat insert 452 may be larger than the upstream seat insert 454 to create this unbalanced seal. This difference in diameter of the two seat inserts 452, 454 may lead to an improved total drag force pressure of the gate/seat assembly 450.

This disclosure includes various embodiments for the size or characteristics of seat inserts 452, 454 to create this unbalanced seal. The difference in size or diameter may be one way to achieve this unbalanced seat, but thickness of the two seat inserts 452, 454 may also create the unbalanced seal. For example, the thickness of the downstream seat insert 452 may be larger than the upstream seat insert 454. Different masses or weights for the seat inserts 452, 454, which may be accomplished by using different materials or thicknesses of the same material, may also create the unbalanced seal. Using different textures for the surfaces of the seat inserts 452, 454 may also achieve similar results. For example, seat insert 452 may have a different surface texture than seat insert 454 that may lead to a better metal-to-metal seal and create an unbalanced seal. These embodiments may similarly lead to an improved total draft force pressure for the gate/seat assembly 450. Further, multiple embodiments may be used in combination to achieve the best results. For example, the diameter size and thickness may be different for one seat insert 452 in comparison to the other 454.

This disclosure includes additional types of valves that may include two seats. For example, Globe Valves that utilize two seats may benefit from an unbalanced seal where the downstream seat is larger than the upstream seat, thereby creating more surface area for the metal-to-metal seal of the plug and seat. Two-seated Ball Valves may also benefit from an unbalanced seal where the downstream seat is larger than the upstream seat, thereby creating more surface area for the seal of the ball with the seat.

Figure 5A:
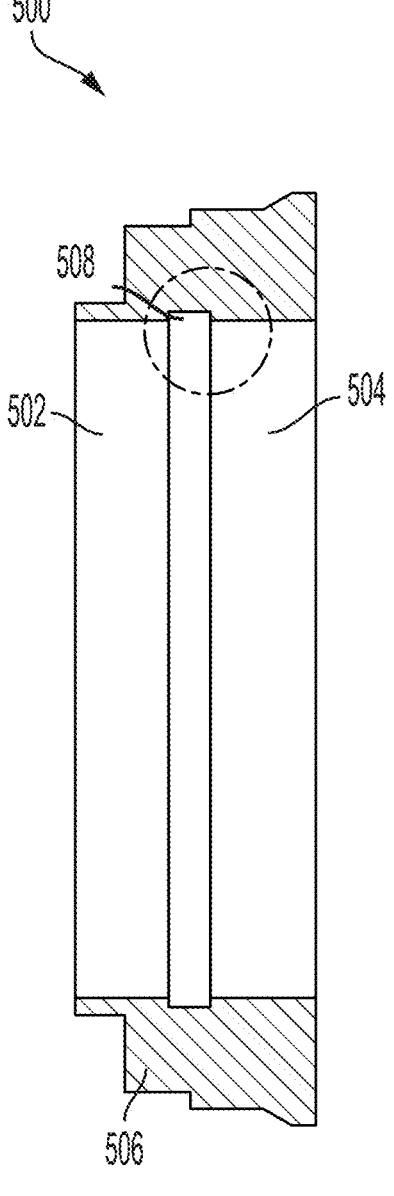
FIG. 5A shows an alternative embodiment of the front view of the seat assembly according to certain embodiments of the present invention.
Figure 5B:
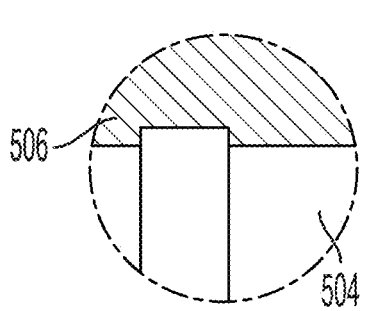
FIG. 5B shows an enlarged section of the seat assembly shown in FIG. 5A according to certain embodiments of the present invention.

FIG. 5A shows an alternative embodiment of a front view of a seat assembly 500. The gate is not shown in FIG. 5A. This seat assembly 500 shows a first diameter 504 of a seat insert than interfaces the gate body (not shown) and a second diameter 502 of the seat insert that are similar in diameter. A middle diameter 508 of the seat insert may be larger than the first 504 and second diameters 506. This is different than the configuration shown in FIG. 3, where the seat insert comprises a step relationship between the diameters of the portions of the seat insert. A complementary pocket insert 506 houses or holds the seat insert in place against the gate body. FIG. 5B shows an enlarged view of the different diameters 502, 504, 508 and the pocket insert 506. Even with this alternative configuration, the diameter of the upstream seat insert may be smaller than the diameter of the downstream seat insert to create an unbalanced seal.

Figure 6:
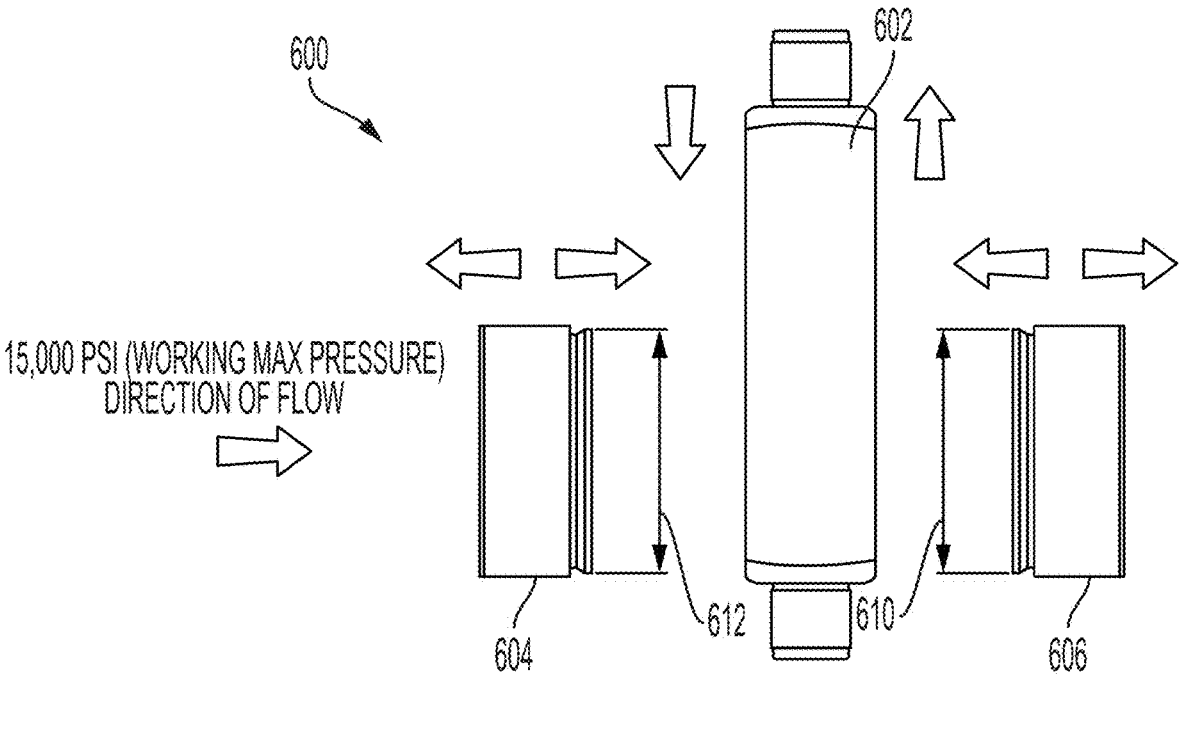
FIG. 6 shows a front view of a gate and a seat assembly according to certain embodiments of the present invention.

FIG. 6 shows the general movement of components of the gate valve assembly 600 according to certain embodiments of the present invention. A gate 602 is designed to seal against two seats 604, 606 on opposite sides of the gate 602. Fluid or water moves through the gate and seat assembly 600 from left to right in FIG. 6 at around 15,000 psi (max operation pressure). As discussed above, the gate 602 moves up and down to open and close the valve 600. Due to the high pressure, the seats 602, 604 move a small amount as the pressure increases and decreases (biased towards the gate 602). For example, as the pressure increases to around 15,000 psi in the open position, the seat 604 may telescope towards the gate 602 due to the fluid pressure through the passageway (upstream), while the seat 606 may telescope towards the gate 602 (downstream). Both seats 606 are biased towards the gate in operation. In this embodiment, an outer diameter 612 of the upstream seat 604 is smaller than an outer diameter 610 of the downstream seat 606 to create an unbalanced seal. For example, the upstream seat 604 may have an outer diameter of 9.685 in. (612) and the downstream seat 606 may have an outer diameter 9.715 in. (610). In some embodiments, the difference in diameter between the upstream seat and downstream seat may be less than 1%. These diameters can be adjusted and or swapped upstream to downstream to improve the sealing ability of the assembly as per application.

Figure 7:
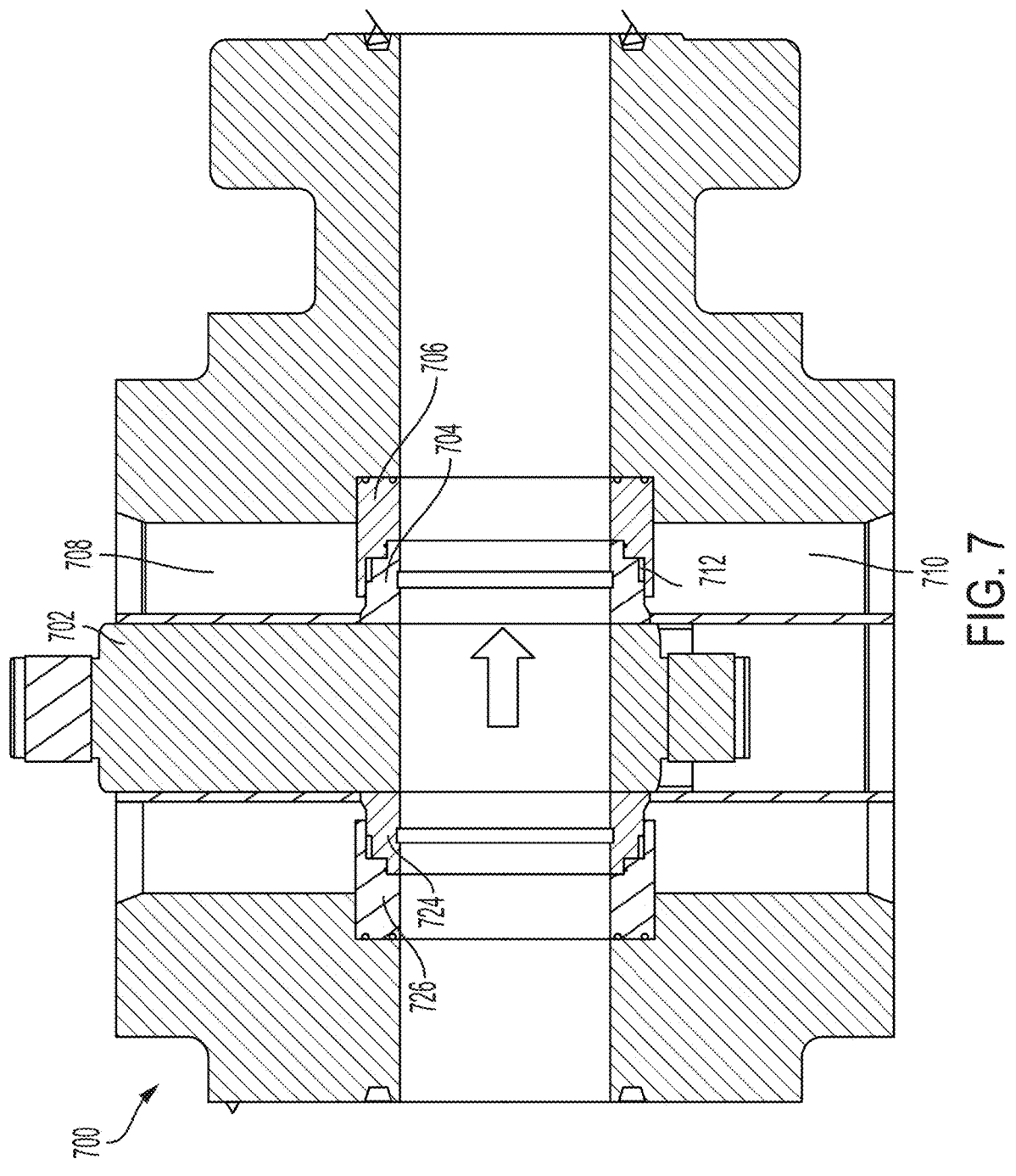
FIG. 7 shows a front view of a gate and seat assembly according to certain embodiments of the present invention.

FIG. 7 shows a gate valve assembly 700 with the movement of fluids or water through the assembly 700. An arrow shows the movement of the fluids or water from upstream to downstream through the gate valve assembly 700. The gate valve assembly 700 shown in FIG. 7 more resembles the configuration shown in FIG. 5A than FIG. 4B, although both embodiments show the present invention. The gate valve assembly 700 comprises a seat or seat insert 724 and a pocket insert 726 on the upstream side, and a seat or seat insert 704 and a pocket insert 706 on the downstream side. In some embodiments, the outer diameter of seat 724 is a different size than the outer diameter of seat 704. The gate 702 moves up and down to open and close the passageway.

In gate valve assembly 700 there are numerous cavities related to gate 702 and seats 704, 724. For example, upper downstream cavity 708 is above seat 704 and lower downstream cavity 710 is below seat 704. In operation, 15,000 psi of fluid with frac sand may be flowing through the passageway, while gate 702 may be moving up and down. The seals between gate 702 and seats 704, 724 must be strong and tight to prevent proppants, frac sand, grease, or other materials from entering the cavities 708, 710 in the gate valve assembly 700. In the past, grease has been injected to these areas of the gate valve assembly 700 between operations to ensure that grease, sand, or proppants do not enter the cavities and reduce performance. This takes time and effort and forces the team to take apart and rebuild these portions of the gate valve assembly 700. As shown above numerous components, including numerous seals, make this break down and set up process even more time consuming. By reducing the need to repeatedly apply this grease to the gate valve assembly 700 and keeping the cavities 708, 710 clear of grease and sand, operations at the frac site may be improved.

Improving the strength or quality of the seals between gate 702 and the seats 704, 724 would help to keep the cavities 708, 710 (seat bore cavities) and other areas of the valve assembly clear of grease and sand and reduce the need for multiple applications of grease. This unbalance seal of the gate/seat interface has been shown to improve these seals. In one embodiment, the outer diameter of the upstream seat 724 is around 0.5% less than the outer diameter of the downstream seat 704, which has been shown to improve the drag force pressure and sealing for the gate valve assembly 700. In one embodiment, reduction of the outer diameter of the upstream seat 724 and an increase of the outer diameter of the downstream seat 704 of the same amount improve the total drag force pressure of the gate valve assembly 700. Thus, even if the drag force is decreased on the upstream seat 724, the drag force is increased on the downstream seat 704 enough to show a higher total drag force pressure. The lower drag force on the upstream seat 724 also allows the gate 702 to seal at lower pressures and open with less pressure. Pressure may be bled off the gate valve assembly and the metal-to-metal seal may be maintained through the axis of the seat bore cavity. Although this embodiment is shown for one direction of frac fluid flowing, these gate/seat seals will seal in both directions.

FIG. 7 also shows a bidirectional seal 712 that was discussed above. The bidirectional seal 712 improves the seal between the seat 704 and the pocket insert 706 by partially filling the cavity between these two components. This prevents proppants or frac sand from entering the cavity between the seat 704 and the pocket insert 706. Further, the bidirectional seal 712 seal moves within the cavity during operation to absorb additional pressure from the flow of frac fluid through the gate valve assembly 700. This helps to prevent high open torque in the valve assembly 700.

A control system may be installed to control this type of valve assembly (and the gate within). In some embodiments the components of the valve assemblies may have sensors to detect the state of various valves in the system and corresponding water supply and flow. Pressure sensors may be used to read and transmit pressure readings at various locations within the valve assemblies. For example, one or more pressure sensors in a valve may read and transmit pressure readings to system control that may be used to close or open the valve assemblies. Transceivers may be attached to these components to transmit this data, then the system control can monitor, manage, and control the valve assemblies. As discussed above, sensors may also be applied to the valves to enable opening and closing the valves (or gates in the valve) in coordination. The system control may also comprise an antenna to transmit to and receive signals from the valve assemblies.

The ability to control the valve assemblies through a control system may take many different forms. For example, the data may be uploaded to a website, where an operator can view and manage the valve assemblies through a website portal. The control system may also be offsite with electronic components for wireless reception and transmission onsite to communicate with the various components of the operation. In some embodiments, the control system may simply be a computer or tablet with corresponding software to run the fracturing operation onsite. By moving control of the system to a computer, tablet, website, or remote locations with corresponding computer software, safety may be improved because workers can stay a safe distance away from the operation.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A valve assembly comprising:
a gate that is configured to move in a direction that is substantially perpendicular to the flow of liquid through a body of the valve assembly;
a first seat insert that is configured to seal against a first side of said gate, wherein said first seat insert comprises a single element with a first sealing surface that is at least configured to interface said gate during operation;
a second seat insert that is configured to seal against a second side of said gate, wherein said second seat insert comprises a single element with a second sealing surface that is at least configured to interface said gate during operation;
wherein said first sealing surface of said first seat insert has a larger diameter than said second sealing surface of said second seat insert;
wherein a first and a second gate guide are configured to interface with said gate.

2. The valve assembly of claim 1 wherein said first seat insert is configured to be sealed on a downstream side of said gate and said second seat insert is configured to be sealed on an upstream side of said gate during operation.

3. The valve assembly of claim 2 wherein a diameter of said first seat insert is larger than a diameter of said second seat insert.

4. The valve assembly of claim 2 wherein a thickness of said first seat insert is larger than a thickness of said second seat insert.

5. The valve assembly of claim 1 wherein a first pocket insert is configured to hold said first seat insert and a second pocket insert is configured to hold said second seat insert, wherein said first pocket insert is a different size than said second pocket insert.

6. The valve assembly of claim 5 wherein diameters of said first seat insert and said first pocket insert are larger than diameters of said second seat insert and said second pocket insert.

7. The valve assembly of claim 5 wherein a first bidirectional seal is configured to interface with said first seat insert and said first pocket insert and a second bidirectional seal is configured to interface with said second seat insert and said second pocket insert.

8. A gate valve assembly comprising:
a valve body;
a gate that is configured to open and close a fluid passageway within said valve body;
a first seat insert that is configured to interface a first side of said gate at a first sealing surface, wherein said first seat insert is a first monolithic element of said gate valve assembly;
a second seat insert that is configured to interface a second side of said gate at a second sealing surface, wherein said second seat insert is a second monolithic element of said gate valve assembly;
wherein said first seat insert has a larger diameter than said second seat insert, and wherein said first sealing surface is a larger than said second sealing surface;
wherein a first and a second gate guide are configured to interface with said gate.

9. The gate valve assembly of claim 8 wherein said first seat insert is configured to interface said first side of said gate on a downstream side of said gate and said second seat insert is configured to interface said second side of said gate on said upstream side of said gate.

10. The gate valve assembly of claim 8 wherein a first pocket insert is configured to hold said first seat insert and a second pocket insert is configured to hold said second seat insert, wherein said first pocket insert has a different diameter than said second pocket insert.

11. The gate valve assembly of claim 10 wherein a diameter of said first pocket insert is larger than a diameter of said second pocket insert.

12. A valve assembly for use in frac operations to deliver fluid to a well site comprising:
an insert that is configured to open a fluid passageway within said valve assembly;
a first seat that is configured to interface a first side of said insert at a first sealing surface of said first seat when said fluid passageway is open, wherein said first seat is configured to comprise a single component of said valve assembly;
a second seat that is configured to interface a second side of insert at a second sealing surface of said second seat when said fluid passageway is open, wherein said second seat is configured to comprise a single component of said valve assembly;
wherein said first seat has a larger diameter than said second seat, and wherein said first sealing surface is larger than said second sealing surface;
wherein a first and a second gate guide are configured to interface with said gate.

13. The valve assembly of claim 12 wherein said insert is a gate.

14. The valve assembly of claim 12 wherein said insert is a ball.

15. The valve assembly of claim 13 wherein said first seat has a larger thickness than said second seat.

16. The valve assembly of claim 13 wherein a first pocket insert is configured to hold said first seat and a second pocket insert is configured to hold said second seat, wherein said first pocket insert is larger than said second pocket insert.

17. The valve assembly of claim 16 wherein a first bidirectional seal is configured to interface with said first seat and said first pocket insert and a second bidirectional seal is configured to interface with said second seat and said second pocket insert.

\* \* \* \* \*